United States Patent
Ausserlechner (10) Patent No.: US 10,648,834 B2
(45) Date of Patent: May 12, 2020

(54) MAGNET ARRANGEMENT FOR ANGLE DETECTION

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 138 days.

(21) Appl. No.: 15/818,380

(22) Filed: Nov. 20, 2017

(65) Prior Publication Data
US 2019/0154464 A1   May 23, 2019

(51) Int. Cl.
*G01D 5/14*   (2006.01)

(52) U.S. Cl.
CPC .............. *G01D 5/14* (2013.01); *G01D 5/145* (2013.01)

(58) Field of Classification Search
CPC ........... G01D 5/14; G01D 5/142; G01D 5/145
See application file for complete search history.

(56) References Cited

U.S. PATENT DOCUMENTS

| 7,298,395 B2 * | 11/2007 | Fukaya | G01D 5/145 348/149 |
| 2016/0026132 A1 | 7/2016 | Ausserlechner | |
| 2017/0122779 A1 * | 5/2017 | Krishna | G01D 5/145 |

FOREIGN PATENT DOCUMENTS

| DE | 10 2015 104 795 | | 9/2016 |
| JP | 2010160036 A | * | 7/2010 |

* cited by examiner

*Primary Examiner* — Walter L Lindsay, Jr.
*Assistant Examiner* — Milton Gonzalez
(74) *Attorney, Agent, or Firm* — Harrity & Harrity, LLP (57) ABSTRACT

A ring-shaped magnet arrangement for use in determining a rotational angle of a rotatable shaft. The ring-shaped magnet arrangement being connected to or formed as part of the rotatable shaft for co-rotation with the rotatable shaft around a rotational axis. The ring-shaped magnet arrangement includes a first ring portion including a first wedge surface and a second ring portion including a second wedge surface. The first wedge surface and the second wedge surface form a wedge in a sensor facing end of the ring-shaped magnet arrangement. The sensor facing end is axially opposite a radial end of the ring-shaped magnet arrangement.

20 Claims, 9 Drawing Sheets

FIG. 1A

FIG. 2A (Plan view)

215

(Elevated view)

MAGNET ARRANGEMENT FOR ANGLE DETECTION

BACKGROUND

A magnetic sensor may be capable of sensing components of a magnetic field applied to the magnetic sensor, such as a magnetic field magnitude, a magnetic field intensity, a magnetic field direction (e.g., based on directional components of the magnetic field), etc. The magnetic field of the magnet may depend on a magnetization of the magnet, a shape of the magnet, an environment of the magnet, and other factors. The magnetic sensor may be used to detect, for example, movement, position, an angle of rotation, etc., of a magnet, which may be connected to an object, in a variety of applications, such as a mechanical application, an industrial application, or a consumer application.

SUMMARY

According to some implementations, a ring-shaped magnet arrangement for use in determining a rotational angle of a rotatable shaft, the ring-shaped magnet arrangement configured to be connected to or formed as part of the rotatable shaft for co-rotation with the rotatable shaft around a rotational axis, wherein the ring-shaped magnet arrangement includes a first ring portion including a first wedge surface, wherein the first ring portion is magnetized in a first direction; and a second ring portion, that is diametrically opposite the first ring portion, the second ring portion including a second wedge surface, wherein the first wedge surface and the second wedge surface form a wedge in a sensor facing end of the ring-shaped magnet arrangement, and wherein the second ring portion is magnetized in a second direction that is within a threshold angle of the first direction and different from the first direction, wherein the sensor facing end is axially opposite a radial end of the ring-shaped magnet arrangement, wherein the ring-shaped magnet arrangement comprises a single piece of material with an intersecting thickness corresponding to an axial distance between the radial end of the ring-shaped magnet arrangement and a base of the wedge.

According to some implementations, a rotational angle detection system includes a ring-shaped magnet arrangement for use in determining a rotational angle of a rotatable shaft, the ring-shaped magnet arrangement configured to be mounted on or formed as part of the rotatable shaft for co-rotation with the rotatable shaft around a rotational axis, wherein the ring-shaped magnet arrangement is configured to include: a first ring portion magnetized in a first direction, and a second ring portion magnetized in a second direction that is between 120 degrees and 180 degrees from the first direction, wherein a first wedge surface of the first ring portion and a second wedge surface of the second ring portion form a wedge in a sensor facing end of the ring-shaped magnet arrangement, and the ring-shaped magnet arrangement includes an intersecting thickness corresponding to an axial distance between a base of the wedge and a radial end, of the ring-shaped magnet arrangement, that is axially opposite the sensor facing end; and a magnetic sensor to measure the rotational angle of the rotatable shaft based on a sensed magnetic field formed from the wedge in the sensor facing end of the ring-shaped magnet arrangement.

According to some implementations, a magnet arrangement for use in determining a rotational angle of a rotatable shaft, wherein the magnet arrangement includes a magnet formed of a single piece of material and configured to be connected to or formed as part of the rotatable shaft for co-rotation with the rotatable shaft around a rotational axis, the magnet including a first magnet portion that includes a first surface, wherein the first magnet portion is magnetized in a first direction; and a second magnet portion, that is diametrically opposite the first magnet portion and includes a second surface, wherein the first surface and the second surface form a wedge in a sensor facing surface of the magnet arrangement, and wherein the second magnet portion is magnetized in a second direction that is opposite the first direction, wherein the sensor facing end is axially opposite a radial end of the magnet arrangement, and wherein the magnet arrangement comprises an intersecting thickness corresponding to an axial distance between the radial end of the magnet arrangement and a base of the wedge, wherein the base of the wedge is perpendicular to the rotational axis.

DETAILED DESCRIPTION

The following detailed description of example implementations refers to the accompanying drawings. The same reference numbers in different drawings may identify the same or similar elements.

In some instances, a rotational angle detection system may use a magnet arrangement with tapered magnets to determine a rotational angle of a rotatable shaft. In such cases, a plurality of magnetic sensors may be placed in a sensing plane (e.g., to form a reading circle concentric with the rotatable shaft) to measure a magnetic field generated by the magnet arrangement. The tapered magnets form a wedge in a sensor facing end of the magnet arrangement, while maintaining a planar end opposite the sensor facing end as the tapered magnets are thicker toward an outside edge of the magnet arrangement and are infinitely thin at an inside edge of the magnet arrangement toward the planar end. However, the tapered magnets (which may be held in place via a supporting structure connected to or formed as a part of the rotatable shaft), may generate a magnetic field that, when measured by the magnetic sensors, produces measurements in an impure sine wave as the rotatable shaft rotates. Due to impurities in the sine wave, the measurements of the magnetic sensors may not allow for accurate rotational angle detection (e.g., within 1 degree) as the impurities in the sine wave provide a relatively high margin of error (e.g., accuracy to within 5-10 degrees). Some implementations described herein allow for more accurate rotational angle detection (e.g., within 1 degree) by providing a magnet arrangement that causes a magnetic field capable of being measured in a relatively pure sine wave. The relatively pure sine wave enables rotational angle detection (e.g., via the magnetic sensors or a controller of the magnetic sensors) to within 1 degree.

Furthermore, physical properties of the tapered magnets and supporting structure (e.g., swashplate or flange) to hold the tapered magnets may cause mechanical issues within the rotational angle detection system. For example, adhesive and/or bonds used to form the magnet arrangement with the tapered magnets and support structure may wear away over time, resulting in further erroneous angle measurements, mechanical failure, and/or damage to the rotational angle detection system or a machine utilizing the rotational angle detection system. Furthermore, the physical properties of the tapered magnets (e.g., infinitely thin wedges of the tapered magnets) may produce weak magnetic fields, further resulting in weak magnetic field measurements and further inaccurate rotational angle detection and/or risk of demagnetization or altering of the magnetization of the magnet arrangement. Some implementations herein address the mechanical issues and problems with the physical properties of a magnet arrangement with tapered magnets by forming a magnet arrangement with a wedge from a single piece of material and magnetizing the single piece of material to include an intersecting thickness between portions of the piece of material magnetized in opposite directions. As such, the physical properties of the magnetized piece of material that form the magnet arrangement may provide improved mechanical strength, stronger magnetic fields, and less risk of demagnetization over magnet arrangements that utilize separate tapered magnets.

The description herein may refer to a right-handed Cartesian coordinate system (x, y, z), where the z-axis is identical to a rotational axis of a rotatable shaft, in which an angular position of the rotatable shaft is to be determined by magnetic sensors based on sensing magnetic fields of magnets connected to or formed as part of the rotatable shaft. In some descriptions, for radial and azimuthal positions or coordinates, a radius (R) may be determined from:

$$R^2 = x^2 + y^2 \quad (1)$$

and a $\tan(\Psi) = y/x$, such that a cylindrical coordinate system (R, $\Psi$, z), includes the z-axis being identical to the rotational axis of the rotatable shaft. In contrast to the azimuthal coordinate, $\Psi$, an angular position of the rotatable shaft is referred to as the rotational angle ($\Phi$).

Figure 1A:
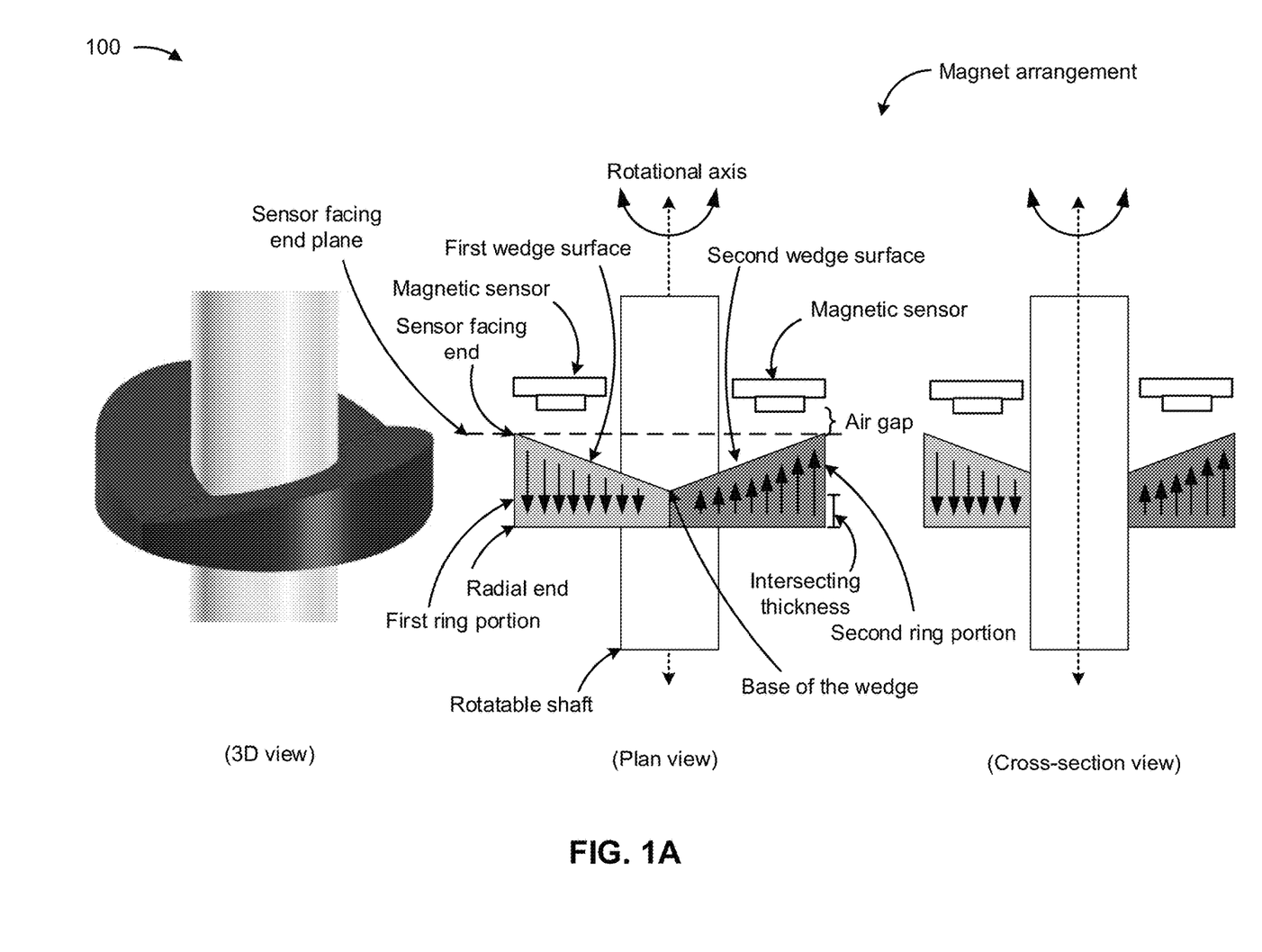
FIGS. 1A and 1B are diagrams of an overview of an example implementation described herein.
Figure 1B:
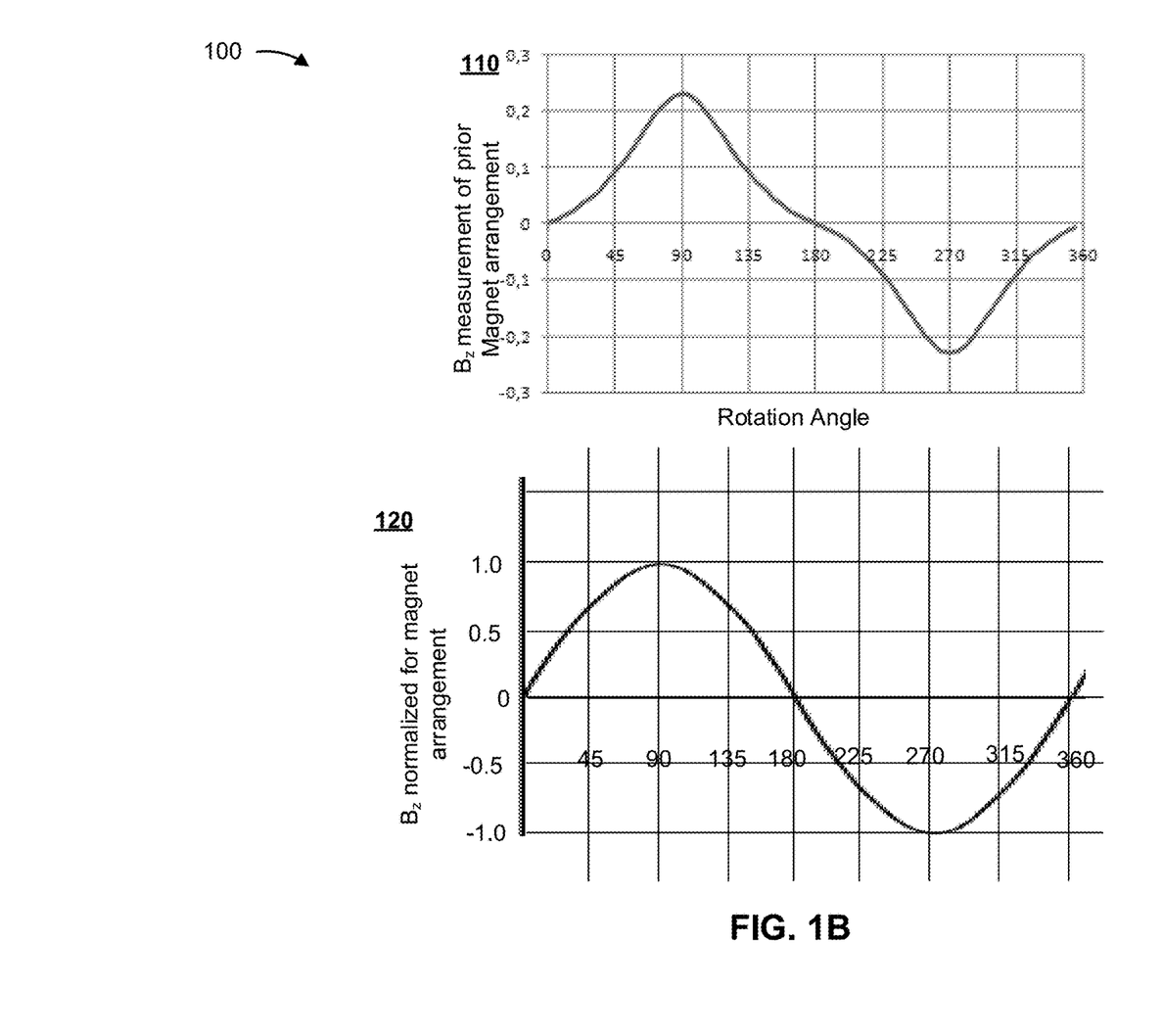

FIGS. 1A and 1B are diagrams of an overview of an example implementation 100 described herein. Example implementation 100 includes a magnet arrangement for use in a detection system that utilizes a plurality of magnetic angle sensors. As shown in FIG. 1A, example implementation 100 includes multiple magnetic sensors placed around a rotatable shaft. As shown, the magnet arrangement (e.g., a ring magnet arrangement or ring-shaped magnet arrangement (e.g., a circular cylindrical ring magnet arrangement, an elliptic cylindrical ring magnet arrangement, and/or the like)) may be connected to or formed as a part of the rotatable shaft, such that the magnet arrangement co-rotates with the rotatable shaft around a rotational axis of the rotatable shaft. As shown, an air gap (e.g., an axial distance of approximately 0.5-3 millimeters (mm)) is between the magnetic sensors and the magnet arrangement.

As shown in FIG. 1A, example implementation 100 includes a magnet arrangement that causes the magnetic sensors to sense measurements of a magnetic field component (e.g. an axial magnetic field component $B_z$) in a sine wave that includes a relatively low amount of (if any) anomalies to enable accurate rotational angle measurement (e.g., within 1 degree) by a rotational angle detection system. The magnet arrangement of example implementation 100 includes a wedge in a sensor facing end of the magnet arrangement. As shown in FIG. 1A, an intersecting thickness is provided in the magnet arrangement between a base of the wedge and the radial end of the magnet arrangement. According to some implementations, the intersecting thickness is at least a threshold percentage (e.g., 15 percent, 20 percent, 25 percent, and/or the like) of an overall axial thickness of the magnet arrangement (e.g., a thickness measured from the sensor facing end plane to the radial end) and/or at least a minimum threshold thickness (e.g., 1 mm). Accordingly, rather than prior magnet arrangements that used separate tapered magnets in combination with a support structure (e.g., a swashplate), the magnet arrangement of FIG. 1A can be formed from a single piece of material, allowing for increased durability, stronger magnetic fields, decreased risk of demagnetization, and increased accuracy in determining a rotational angle of the rotatable shaft.

Furthermore, as shown in FIG. 1A, the magnet arrangement of example implementation 100 includes a first ring portion magnetized in a first direction (shown as downward) and parallel to the rotational axis and a second ring portion magnetized in a second direction (shown as upward) that is opposite the first direction and parallel to the rotational axis. In some implementations, the first ring portion and the second ring portion of the magnet arrangement may be magnetized such that the magnetizations are opposite or anti-parallel (e.g., 180 degrees from one another along the rotational axis), but at a threshold angle (e.g., within 10 degrees) relative to the rotational axis. In some implementations, the first ring portion and the second ring portion of the magnet arrangement may be magnetized such that the magnetizations are within a threshold angle (e.g., between 120 degrees and 180 degrees) of one another. As such, the first ring portion and the second ring portion may be formed from a same material based on the directions of magnetization of the first ring portion and the second ring portion.

In FIG. 1A, the first ring portion includes a first wedge surface and the second ring portion may include a second wedge surface that form the wedge. According to some implementations, the first wedge surface may be diametrically symmetric to the second wedge surface, such that the first wedge surface has substantially the same dimensions (e.g., area, radii, and/or the like), same characteristics (e.g., slope relative to the radial end), same shape, and/or the like. As shown in FIG. 1A, the base of the wedge in the sensor facing end and/or the intersecting thickness may serve as an intersection of magnetization, as the magnetic material of the first ring portion is magnetized in a first (e.g., downward) direction and the magnetic material of the second ring portion is magnetized in a second (e.g., upward or opposite) direction.

According to some implementation described herein, the radial end of the magnet arrangement may be perpendicular to the rotational axis of the rotatable shaft. In some instances, the rotatable shaft is not permanently magnetic (e.g., the rotatable shaft may be steel with permeability ($\mu r$)>100 (soft magnetic) or $\mu r \approx 1$ (non-magnetic)). In some implementations, the magnet arrangement may include a support structure for additional support in connecting the magnet arrangement to the rotatable shaft. In such cases, the rotatable shaft may be soft magnetic and the support structure may be non-magnetic to provide robustness against disturbance of the magnetic fields of the tapered magnets.

The magnetic sensors of example implementation 100 may determine a rotational angle of the rotatable shaft based on sensing components (e.g., radial, azimuthal, or axial) of a magnetic field of the respective magnet arrangement. For example, the magnetic sensors (e.g., hall plates, magnetic field sensitive metal-oxide semiconductor field-effect transistors (MOSFETs) (MAG-FETs), Vertical Hall effect devices, or magneto-resistors (e.g., giant magneto-resistors (GMRs), tunnel magneto-resistors (TMRs), and/or anisotropic (AMRs), etc.), and/or the like) of FIG. 1A may be placed in a same sensing plane (e.g., to form a reading circle that is concentric to the rotational axis) and axially shifted from a sensor facing end of the respective magnet arrangement. The magnetic sensors may be positioned within a threshold radial distance (e.g., corresponding to a radius of a concentric reading circle of the magnetic sensors in the sensing plane) from the rotational axis.

For some implementations described herein, when magnetic sensors are located at an angular position $\Psi_i = 360° \cdot i/N$ with $i=0, 1, \ldots, N-1$ for N magnetic sensors, then a rotational angle detection system may calculate the following:

$$C + jS = \Sigma_{i=0}^{N-1} B(\Psi_i) \times e^{j\Psi_i} \quad (2)$$

where j is representative of the imaginary unit ($\sqrt{-1}$), such that C is a real number (e.g., representative of a cosine wave component) and jS is an imaginary number (e.g., representative of a sine wave component) to create the complex number C+jS. From the complex number C+jS, the rotational angle $\Phi$ of the rotatable shaft can be determined as follows:

$$\Phi = a\tan_2(C, S) \quad (3)$$

using a coordinate rotation digital computer (CORDIC) system calculation. Thereby, $B(\Psi_i)$ is the magnetic field measured at angular position $\Psi_i$ in the sensing plane. According to some implementations, the magnetic field B may be an axial magnetic field component $B_z$ or some other magnetic field component (e.g., radial field component, azimuthal field component, and/or the like).

As mentioned above, and shown in FIG. 1A, the sensor facing end of the magnet arrangement is not planar, as a wedge formed by the tapered magnets. The wedge of the magnet arrangement extends from a sensor facing end plane of the sensor facing end to the intersection of magnetization of the magnet arrangement. The wedge of such magnet arrangements may cause the magnetic sensors to make sinusoidal measurements of the magnetic field of the magnet arrangement.

As shown in FIG. 1B and by graph 110, measurements of an axial magnetic field component $B_z$ from a prior magnet arrangement (e.g., that includes tapered magnets) form a sine wave that includes anomalies. Using these measurements that form the sine wave with anomalies, a rotational angle detection system may not accurately detect the rotational angle (e.g., with an accuracy within 1 degree) of the magnet arrangement (and thus the rotatable shaft). Specifically, a rotational angle detection system that computes C+jS to derive the rotational angle may inaccurately calculate the rotational angle from C+jS due to the anomalies in the sine wave measurements of the axial magnetic field component $B_z$ of the magnetic field caused by the magnet arrangement of example implementation 100. For example, the sensed measurements of a magnetic field of a prior magnet arrangement may be in a wave form that has a third harmonic that is roughly 10 percent of a fundamental frequency as follows:

$$B_z/B_{rem} = \sin(\Phi) + 0.1 \times \sin(3\Phi) \quad (4)$$

resulting in a relatively large margin of error (accuracy may be within 5-10 degrees) when estimating a rotational angle of the magnet arrangement (and, thus, the rotatable shaft). Some implementations described herein address this by providing the magnet arrangement of example implementation 100 that includes an intersecting thickness between a base of the wedge and the radial end.

As shown by graph 120 of example implementation 100 in FIG. 1B, the intersecting thickness of the magnet arrangement reduces a relatively high harmonic content of the axial magnetic field component $B_z$ (shown as a normalized measurement) by eliminating infinitely thin ends of tapered magnets of a prior magnet arrangement. For example, in some instances, a third harmonic of $B_z(\Phi)$ sensed by the magnetic sensors may be approximately 5 percent (which provides an improvement factor of 2 over a prior magnet arrangement). Furthermore, the intersecting thickness enables a stronger magnetic field, while maintaining a relatively same overall size of a prior magnet arrangements (which may include a swashplate to hold tapered magnets). Furthermore, the intersecting thickness in the magnet arrangement may reduce risk of demagnetization over time. For example, the magnet arrangement of example implementation 100 can be comprised of more (e.g., thicker) magnetized material over a prior magnet arrangement.

In some implementations, as further described herein, the sensor facing end of the magnet arrangement may include a first end surface and a second end surface (e.g., by milling ends of the wedge of the sensor facing end) and/or the magnet arrangement may include an elliptic outer circumferential surface.

According to some implementations described herein, a magnet arrangement is provided to cause magnetic sensors, separated by an axial air gap from the magnet arrangement, to measure a sinusoidal magnetic field component of the magnet arrangement to enable increased accuracy (e.g., within 1 degree) in measuring a rotational angle of a rotatable shaft, relative to prior magnet arrangements. Furthermore, in some implementations, the magnet arrangement may be efficiently manufactured to conserve monetary manufacturing resources. Furthermore, according to some implementations, a magnet arrangement described herein may be more mechanically stable than prior magnet arrangements. For example, the magnet arrangement of FIG. 1A may be formed from a single piece of material, thus preventing a need to adhere (e.g., glue) or connect separate materials of a magnet arrangement with a wedge shape (which increases probability of cracks, loss of mechanical bond, and/or the like). Moreover, in some implementations, a magnet arrangement as described herein may reduce risk of demagnetization, due to increased thickness in the magnetized portion of the magnet arrangement over prior magnet arrangements.

As indicated above, FIGS. 1A and 1B are provided merely as examples. Other examples are possible and may differ from what was described with regard to FIGS. 1A and 1B.

Figure 2A:
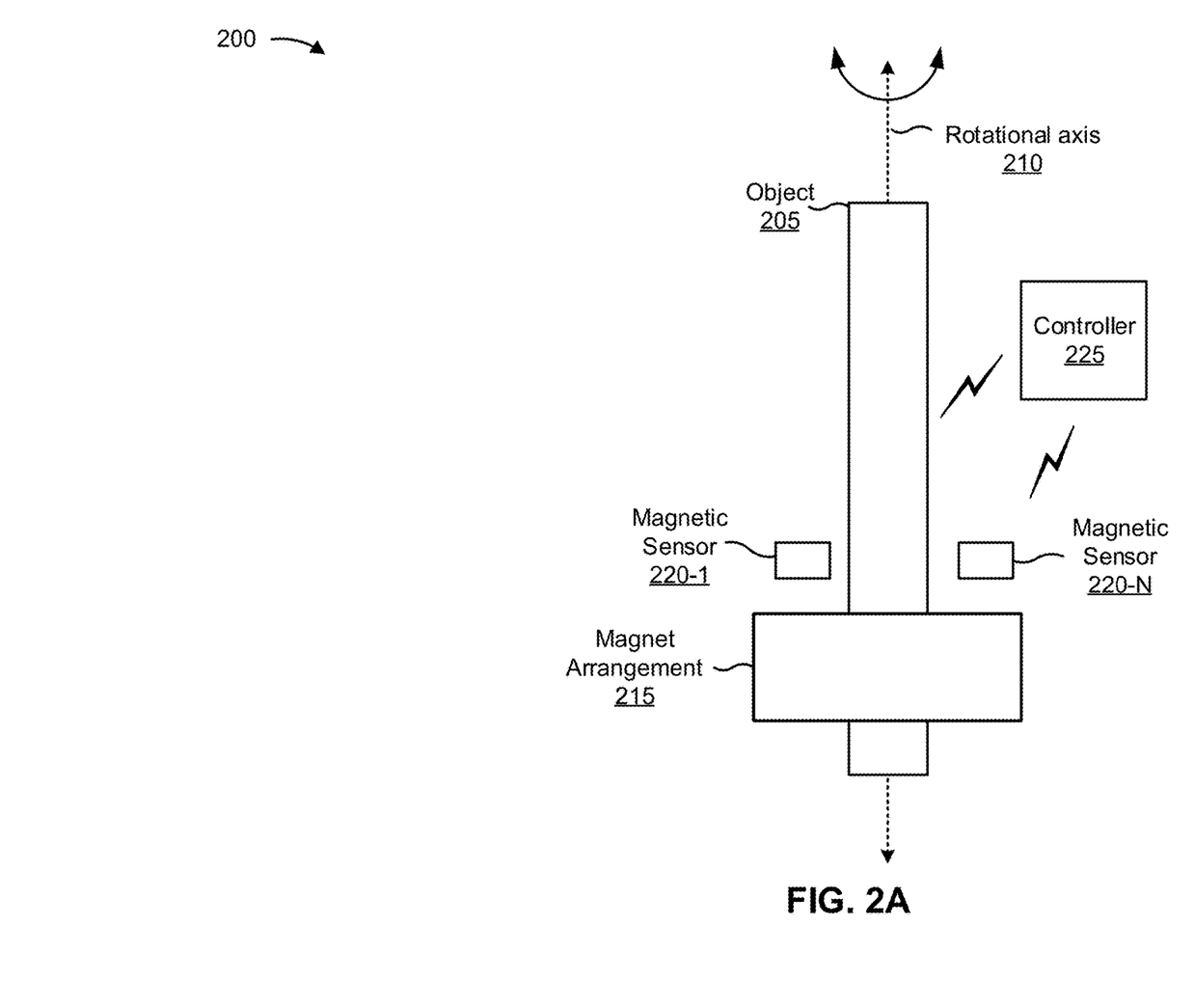
FIGS. 2A and 2B are diagrams of an example environment in which magnet arrangements, systems, and/or methods, described herein, may be implemented.

FIG. 2A is a diagram of an example environment 200 in which magnet arrangements, systems, and/or methods, described herein, may be implemented. As shown in FIG. 2A, environment 200 may include an object 205 (which corresponds to the rotatable shaft of FIG. 1A) that may be positioned with respect to rotational axis 210 (which may be referred to herein as a "z-axis"), a magnet arrangement 215 (which may correspond to the magnet or magnet arrangement of FIG. 1A) connected to or formed as a part of object 205, magnetic sensors 220-1 to 220-N(N≥1) (which may correspond to the magnetic sensors of FIG. 1A and are hereinafter referred to collectively as "magnetic sensors 220," and individually as "magnetic sensor 220"), and a controller 225.

Object 205 is an object for which a rotational angle, a position, and/or the like is of interest for a given application. For example, object 205 may be a part of a mechanical system of a machine (e.g., a vehicle, a manufacturing machine, an industrial machine, an agricultural machine, and/or the like). In some implementations, object 205 is capable of rotating about rotational axis 210. In some implementations, object 205 is cylindrical. In such implementations, the radius of object 205 may be approximately 10 mm.

In some implementations, object 205 is connected to (e.g., attached to, coupled with, affixed to, embedded in, formed as a part of, and/or the like) magnet arrangement 215. Example object 205 may be mostly steel (e.g., a material with permeability (μr)>100, a martensitic stainless steel, a mild steel, and/or the like) and/or a non-magnetic material (e.g., 0.9<μr<1.5, such as aluminum, brass, bronze, copper, plastic, austenitic stainless steel, and/or the like).

Magnet arrangement 215 includes one or more magnets that are connected (e.g., attached, adhered, coupled, affixed, fastened, clipped, clamped, and/or the like) to or formed as a part of object 205 for co-rotation with the object such that a rotation of magnet arrangement 215 corresponds to a rotational angle (or rotational position) of object 205, as described herein. In some implementations, magnet arrangement 215 may include a wedge (e.g., a v-shaped wedge) in a radial end (e.g., a sensor facing end) of the magnet arrangement 215.

Figure 2B:
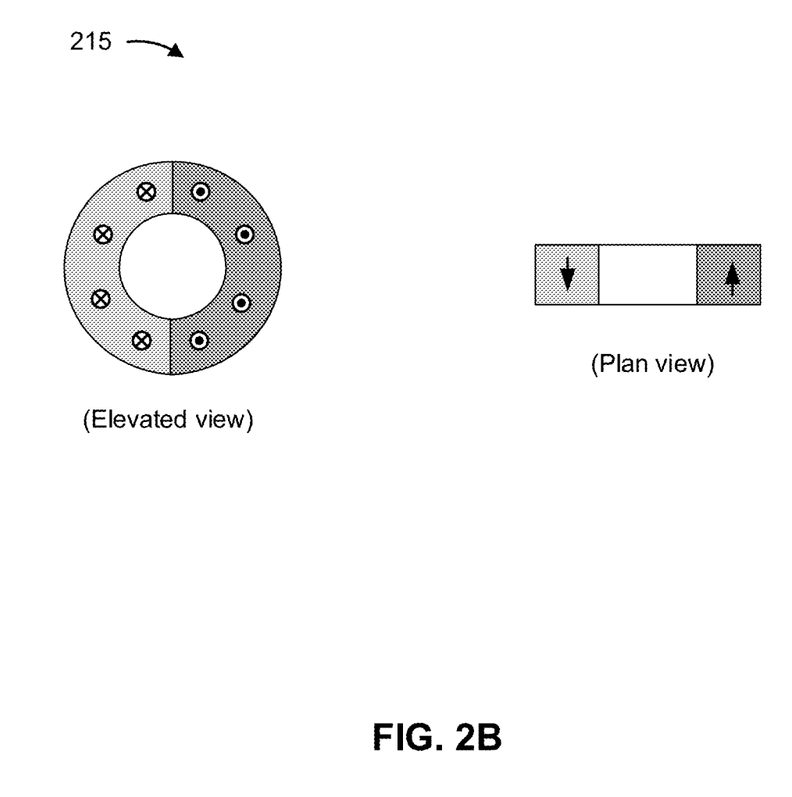

In some implementations, as shown in FIG. 2B, magnet arrangement 215 may include a single piece of material comprised of a pair of magnets that are magnetized in opposite or anti-parallel directions (e.g., the magnetizations are 180 degrees from one another relative to the radial and azimuthal coordinates of the environment). In some implementations, the magnetizations of the pair of magnets is parallel (e.g., parallel (within a tolerance)) to rotational axis 210. In some implementations, the magnetizations are in opposite directions but at an angle relative to the rotational axis. In some implementations, the magnetizations are in not anti-parallel (e.g., 180 degrees from one another along the rotational axis), but a threshold angle (e.g., an angle between 120 degrees and 180 degrees) between the magnetizations is present the magnetizations.

As shown in FIG. 2B, magnet arrangement 215 includes a first half magnetized in a first direction and a second half magnetized, such that magnet arrangement 215 comprises a pair of magnets that are diametrically opposite one another in the magnet arrangement. Additionally, or alternatively, magnet arrangement 215 may include a dipole magnet, a permanent magnet, an electromagnet, a magnetic tape, an axially magnetized magnet, and/or the like.

In some implementations, magnet arrangement 215 may be comprised of a ferromagnetic material (e.g., Hard Ferrite), and may produce a magnetic field. As such, magnet arrangement 215 may be formed or configured from a single piece of material and magnetized to produce a magnetic field (e.g., magnetized to include one or more directions of magnetization). In some implementations, magnet arrangement 215 may further comprise a rare earth magnet, which may be of advantage due to an intrinsically high magnetic field strength of rare earth magnets.

In some implementations, a dimension of magnet arrangement 215 (e.g., a length, a width, a height, a diameter, a radius, and/or the like) may be in a range from approximately 1 millimeter (mm) to approximately 25 mm. Magnet arrangement 215 may be a ring-shaped magnet (e.g., a circular cylinder ring magnet, an elliptic cylinder ring magnet, and/or the like) with a recess and object 205 may be cylindrical. As a particular example, magnet arrangement 215 may have a thickness or height of approximately 6 mm, an inner radius of approximately 10 mm, and an outer radius of approximately 23 mm (i.e., magnet arrangement 215 may be a 8 mm height×4 mm inner radius×8 mm outer radius ring magnet). Notably, while magnet arrangement 215 may be primarily described as a ring-shaped magnet, according to example implementations herein, magnet arrangement 215 may have another shape, such as a cubical shape, a cylindrical shape, an ellipsoidal shape, a triangular shape, a polygonal shape, and/or the like.

In some implementations, magnet arrangement 215 may be connected to object 205 in an asymmetric manner. For example, a center axis of magnet arrangement 215 may not align with rotational axis 210. Although magnet arrangement 215 is shown with sharp edges/corners, edges and/or corners of magnet arrangement 215 may be rounded.

Magnetic sensors 220 of FIG. 2A include one or more apparatuses for sensing one or more components of a magnetic field of magnet arrangement 215 for use in determining a rotational angle (and/or position) of object 205 (e.g., based on a position of magnet arrangement 215 relative to magnetic sensor 220). For example, magnetic sensors 220 may include one or more circuits (e.g., one or more integrated circuits) that operate to sense a set of components (e.g., a z-component, a radial component, and a tangential component) of the magnetic field produced by magnet arrangement 215. According to some implementations, a set of components may include one or more of an intensity of a magnetic field (e.g., a magnetic flux density and/or a magnetic field strength), a magnetic field magnitude, a magnetic field direction, or the like.

Magnetic sensors 220 may be three dimensional (3D) magnetic sensors capable of sensing three directional components of a magnetic field (e.g., a radial component, an azimuthal (tangential) component, and an axial component. In some implementations, magnetic sensors 220 may include respective integrated circuits that include integrated controller 225 and/or a plurality of integrated controllers 225 (e.g., such that an output of magnetic sensors 220 may include information that describes a position of magnet arrangement 215 and/or a position of object 205). In some implementations, magnetic sensors 220 may include one or more sensing elements to sense the set of components of the magnetic field produced by magnet arrangement 215. For example, the sensing element may include a Hall-based sensing element that operates based on a Hall-effect. As another example, the sensing element may include a magneto-resistive based (MR-based) sensing element, elements of which are comprised of a magneto-resistive material (e.g., nickel-iron (NiFe)), where the electrical resistance of the magneto-resistive material may depend on a strength and/or a direction of the magnetic field present at the magneto-resistive material. Here, sensing element may operate based on an AMR effect, a GMR effect, TMR effect, and/or the like. As an additional example, a sensing element of one or more of magnetic sensors 220 may include a variable reluctance (VR) based sensing element that operates based on induction. In some implementations, magnetic sensors 220 may include an analog-to-digital converter (ADC) to convert analog signal received from the sensing elements into digital signals to be processed (e.g., by a digital signal processor (DSP)) by magnetic sensor 220.

In some implementations, magnetic sensors 220 may be arranged in positions relative to magnet arrangement 215 such that magnetic sensors 220 may detect components of a magnetic field produced by magnet arrangement 215. For example, as shown in FIG. 2A, magnetic sensor 220 may be arranged such that magnetic sensors 220 are a particular distance from magnet arrangement 215, such that an air gap (e.g., about 1.3 mm air gap, an air gap in a range from about 1.0 mm to about 1.6 mm, and/or the like) may be present between magnetic sensors 220 and magnet arrangement 215 when magnet arrangement 215 rotates about rotational axis 210. In some implementations, magnetic sensors 220 may be situated in a sensing plane that is an axial distance (e.g. corresponding to the air gap) from a sensor facing end of magnet arrangement 215. In some implementations, if there are two magnetic sensors, the magnetic sensors may be placed at 0 degrees and 90 degrees (where 0 degrees is an arbitrary position of rotation). Further, if three magnetic sensors are to be used, the magnetic sensors may be placed at 0 degrees, 120 degrees, and 240 degrees; if four magnetic sensors are to be used, the magnetic sensors may be placed at 0 degrees, 90 degrees, 180 degrees, and 270 degrees; if five magnetic sensors are to be used, the magnetic sensors may be placed at 0 degrees, 72 degrees, 144 degrees, 216 degrees, 288 degrees, and so on.

In some implementations, magnetic sensors 220 may be configured with mapping information associated with determining a rotational angle of object 205 based on a sensed magnetic field (or a sensed set of components of the magnetic field). Magnetic sensor 220 may store the mapping information in a memory element (e.g., a read only memory (ROM) (e.g., an electrically erasable programmable read-only memory (EEPROM)), a random access memory (RAM), and/or another type of dynamic or static storage device (e.g., a flash memory, a magnetic memory, an optical memory, etc.)) of magnetic sensors 220. The mapping information may include information associated with a rotational angle and a set of components of the magnetic field corresponding to the rotational angle. The mapping information may include such information for multiple rotational angles and/or positions of object 205. In some implementations, magnetic sensors 220 may be configured with the mapping information during a manufacturing process associated with magnetic sensors 220 and/or a rotational angle detection system, a calibration process associated with magnetic sensors 220, a setup process associated with magnetic sensors 220, and/or the like.

During operation, magnetic sensors 220 may sense the set of components of the magnetic field of magnet arrangement 215. Magnetic sensors 220 may then compare the sensed set of components of the magnetic field to the mapping information, and determine the rotational angle of object 205 based on the comparison. For example, magnetic sensors 220 may identify sets of components of the magnetic field, included in the mapping information, that match (e.g., within a threshold or that satisfy a matching threshold) the sensed set of components of the magnetic field (e.g., an amplitude of a radial component of the magnetic field, an amplitude of a tangential component of the magnetic field, or an amplitude of an axial component of the magnetic field). In this example, magnetic sensors 220 may determine the rotational angle of object 205 as the rotational angle corresponding to the matched mapping information.

Controller 225 includes one or more circuits associated with determining a rotational angle (and/or position) of object 205, and providing information associated with the rotational angle of object 205. For example, controller 225 may include one or more of an integrated circuit, a control circuit, a feedback circuit, and/or the like. Controller 225 may receive input signals from one or more magnetic sensors (e.g., from a digital signal processor (DSP) of magnetic sensor 220), such as one or more magnetic sensors 220, may process the input signals (e.g., using an analog signal processor, a digital signal processor, etc.) to generate an output signal, and may provide the output signal to one or more other devices or systems. For example, controller 225 may receive one or more input signals from magnetic sensor 220, and may use the one or more input signals to generate an output signal comprising the rotational angle (or position) of object 205, to which magnet arrangement 215 is connected.

The number and arrangement of apparatuses shown in FIGS. 2A and 2B are provided as examples. In practice, there may be additional apparatuses, fewer apparatuses, different apparatuses, or differently arranged apparatuses than those shown in FIGS. 2A and 2B. Furthermore, two or more apparatuses shown in FIGS. 2A and 2B may be implemented within a single apparatus, or a single apparatus shown in FIGS. 2A and 2B may be implemented as multiple, distributed apparatuses. Additionally, or alternatively, a set of apparatuses (e.g., one or more apparatuses) of environment 200 may perform one or more functions described as being performed by another set of apparatuses of environment 200.

Figure 3:
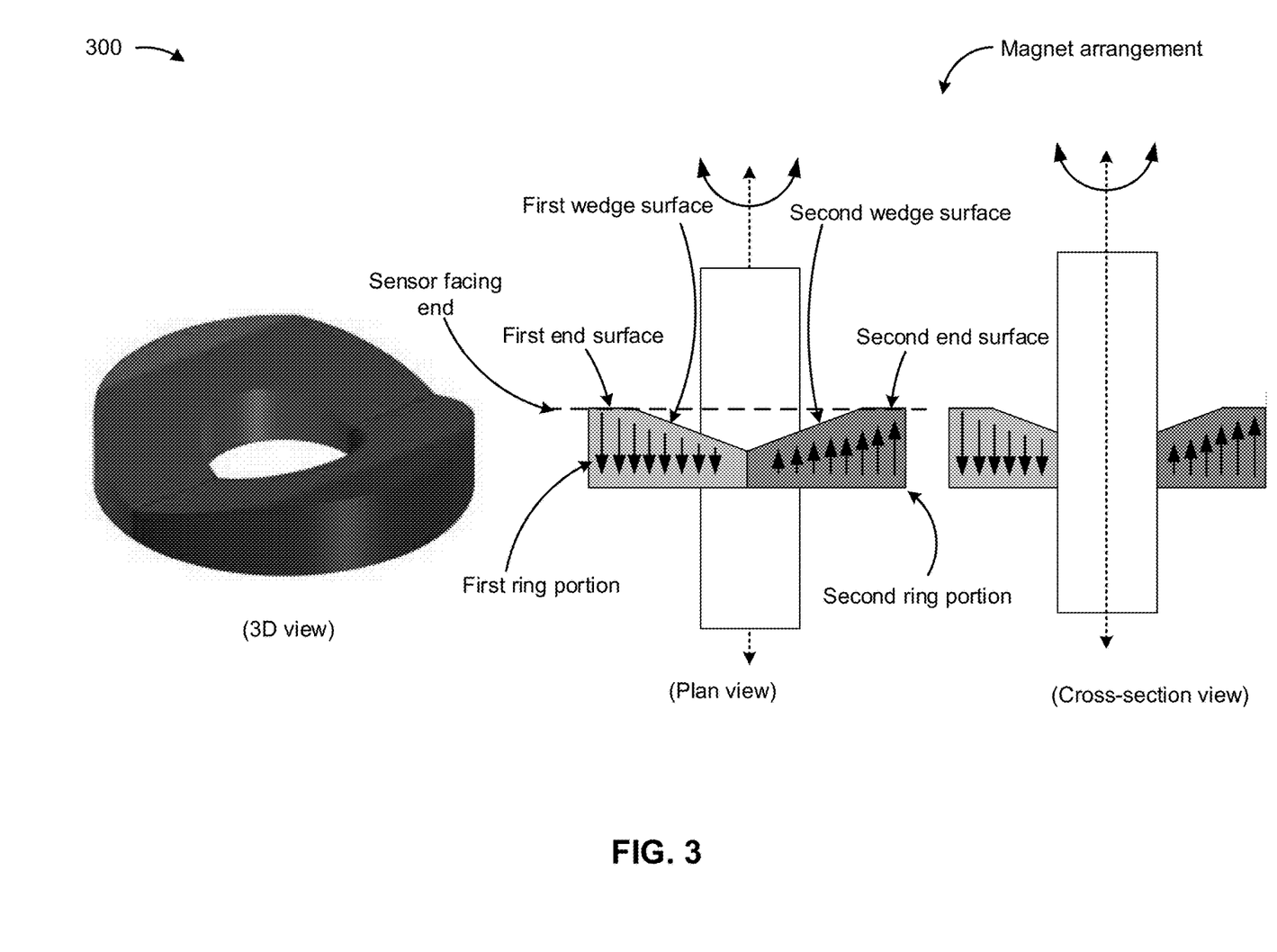
FIGS. 3-6 are diagrams associated with example implementations of magnet arrangements described herein.

FIG. 3 is a diagram associated with an example implementation 300 of a magnet arrangement as described herein. Similar to FIG. 1A, three views are shown of example implementation 300 of the magnet arrangement, and, thus, similar terms used to describe the magnet arrangements of FIG. 1A may be used to refer to the same or like features of the magnet arrangement of example implementation 300. Example implementation 300, as shown in FIG. 3, includes a magnet arrangement with radial end surfaces in the sensor facing end of the magnetic arrangement.

As shown in FIG. 3, the sensor facing end of the magnet arrangement includes a first end surface and a second end surface. The first end surface and the second end surface of example implementation 300 meets a first wedge surface of a first ring portion and a second wedge surface of the second ring portion of the magnet arrangement, respectively. According to some implementations, the first end surface and the second end surface may be in a same plane (e.g., a sensors facing end plane), which may be perpendicular to a rotational axis of the rotatable shaft and/or parallel to a radial end of the magnet arrangement.

According to some implementations, the radial end surfaces in the sensor facing end of the magnet arrangement may generate a magnetic field that enables magnetic sensors to sense an axial component of the magnetic field in a near pure sine wave as the magnet arrangement (and thus the rotatable shaft) rotates. As such, the magnetic sensors may more accurately determine a position of the magnet arrangement (and thus the rotatable shaft) versus prior magnet arrangements, as less anomalies are present in the measured sine wave of the axial component of the magnetic field relative to the prior magnet arrangements.

As indicated above, FIG. 3 is provided merely as an example. Other examples are possible and may differ from what was described with regard to FIG. 3.

Figure 4:
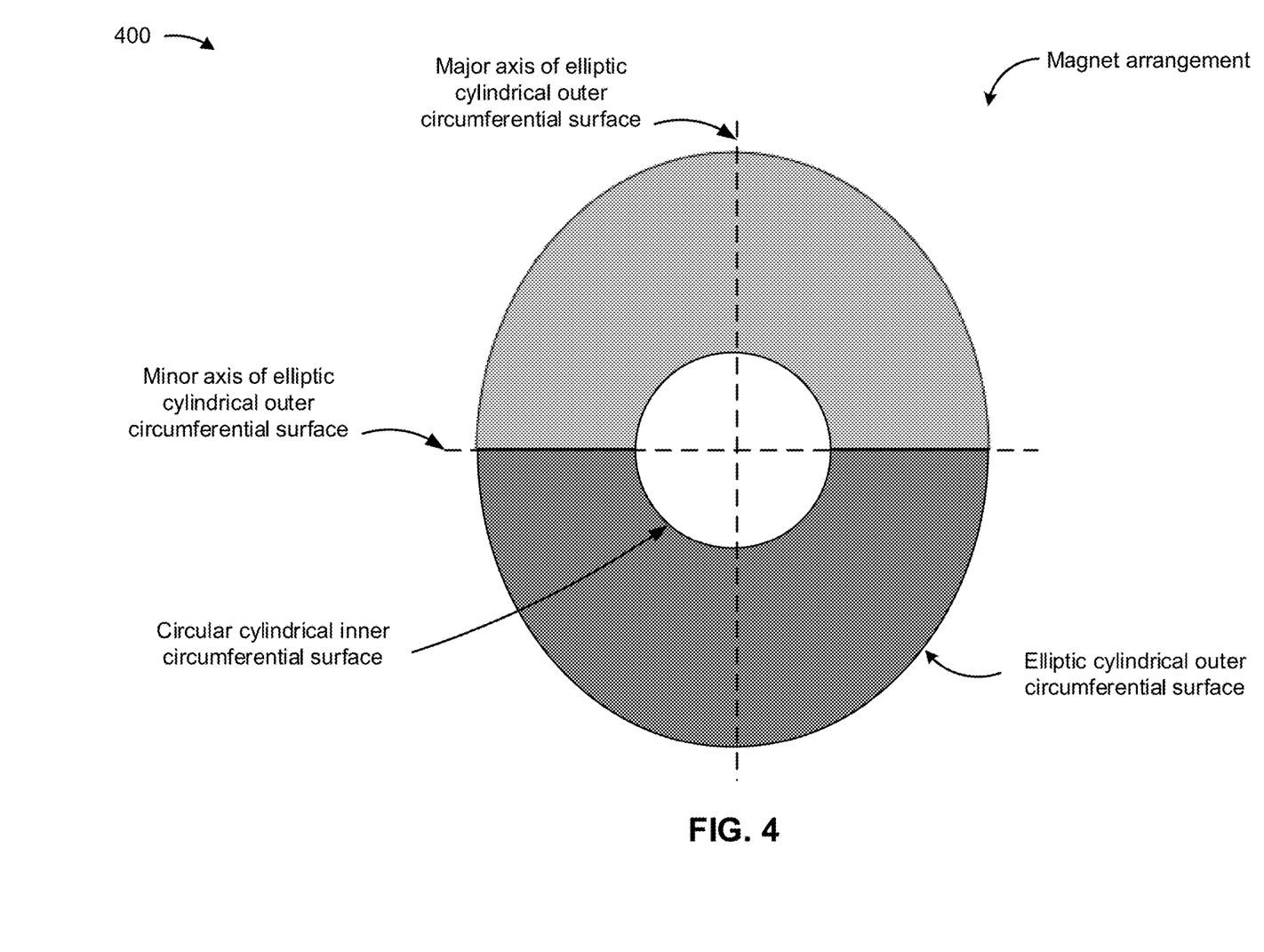

FIG. 4 is a diagram associated with an example implementation 400 of a magnet arrangement described herein. FIG. 4 shows an elevated view of example implementation 400 of the magnet arrangement. As shown, example implementation 400 includes a cylindrical inner circumferential surface and an elliptic cylindrical outer circumferential surface. As shown in FIG. 4, the inner circumferential surface is a circular cylindrical inner circumferential surface. In some implementations, the inner circumferential surface may include an elliptic cylindrical surface or other type of cylindrical surface (e.g., a cylindrical surface that includes defects, a surface area to account of a structure of the rotatable shaft, and/or the like). Furthermore, as shown in FIG. 4, a minor axis of the elliptic cylindrical outer circumferential surface is aligned with the base of the wedge (e.g., the intersection of the first ring portion and the second ring portion) and a major axis of the elliptic cylindrical outer circumferential surface is perpendicular to the base of the wedge.

According to some implementations, the elliptic cylindrical outer circumferential surface of the magnet arrangement may generate a magnetic field that enables magnetic sensors to sense an axial component of the magnetic field in a near pure sine wave as the magnet arrangement (and thus the rotatable shaft) rotates. As such, the magnetic sensors may more accurately determine a position of the magnet arrangement (and thus the rotatable shaft) versus prior magnet arrangements, as fewer anomalies are present in the measured sine wave of the axial component of the magnetic field relative to the prior magnet arrangements.

As indicated above, FIG. 4 is provided merely as an example. Other examples are possible and may differ from what was described with regard to FIG. 4.

Figure 5:
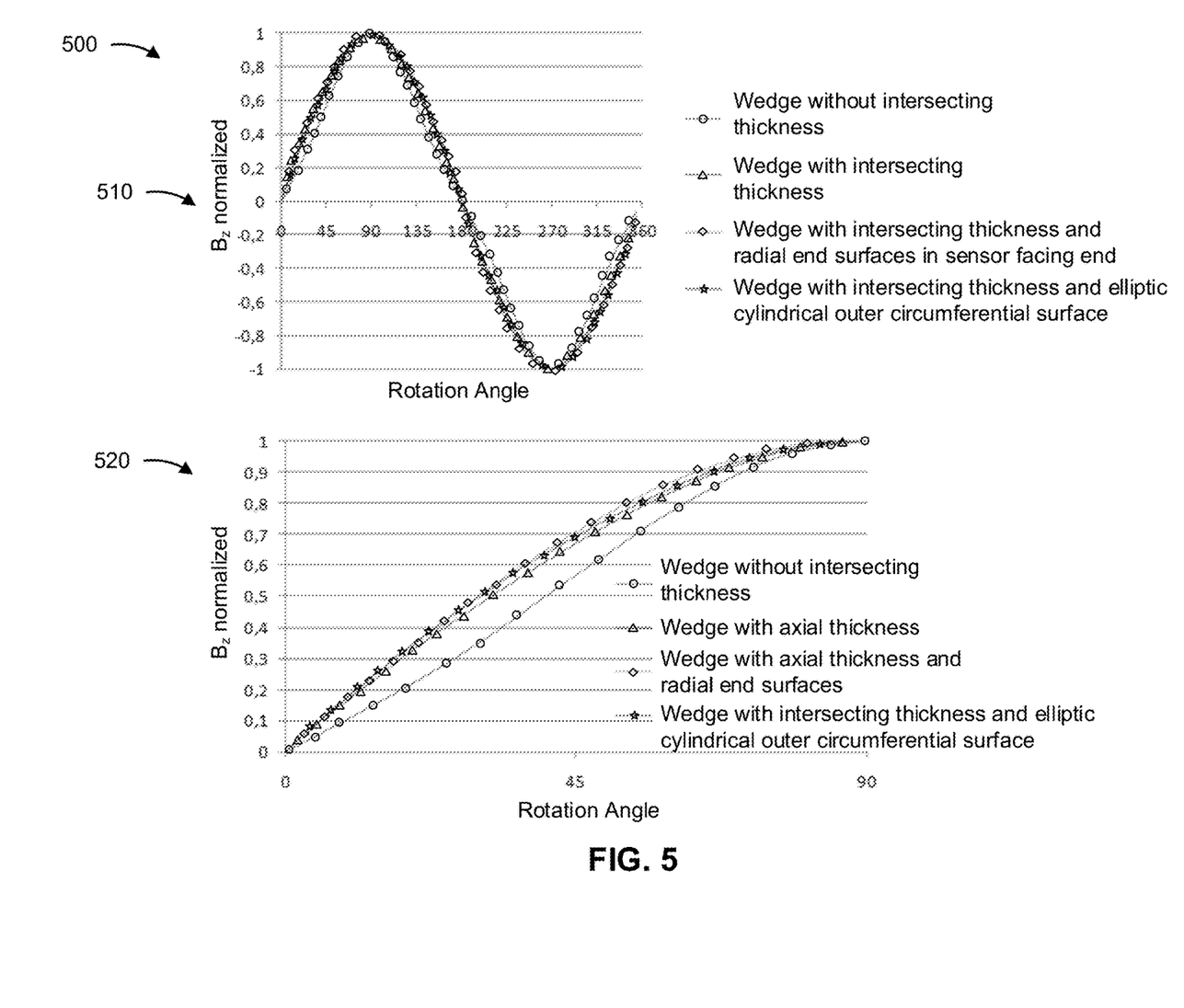

FIG. 5 is a diagram associated with an example implementation of magnet arrangements described herein. FIG. 5 is associated with example graphs 500 of characteristics of a magnet arrangement described herein. Two graphs, representative of results of the example graphs 500, are shown. The first graph, as shown by reference number 510, shows normalized measurements of a sensed axial magnetic field component (By) over a 360 degree rotation. The second graph, as shown by reference number 520, shows normalized measurements of the sensed axial magnetic field component (By) over 90 degrees of the 360 degree rotation to provide an enhanced view of the differences between various configurations of an implementation of a magnet arrangement described herein.

As shown by example graphs 500, characteristics of the magnet arrangement with a wedge and an intersecting thickness provide a magnetic field that causes the magnetic sensors to measure less anomalies in a sine wave of $B_z$. In other words, the sensed measurements of $B_z$ from magnet arrangements that include an intersecting thickness are closer to a pure sine wave than the sensed measurements from a magnet arrangement that does not include an intersecting thickness. Furthermore, as shown by the example graphs 500, additionally including radial end surfaces in a sensor facing end of the magnet arrangement (similar to implementation 300 of FIG. 3) or including an elliptic cylindrical outer circumferential surface (similar to implementation 400 of FIG. 4) with the intersecting thickness in the magnet arrangement can further enhance the sine wave of measurements sensed by the magnetic sensors. Although results of example graphs 500 for such an implementation are not shown, a magnet arrangement may include a wedge as described herein with an intersecting thickness, radial end surfaces in the sensor facing end, and an elliptic cylindrical outer circumferential surface.

Accordingly, example graphs 500 show that measurements of a more pure sine wave of an axial magnetic field component of a magnet arrangement can be sensed by magnetic sensors relative to prior magnet arrangements, enabling the magnetic sensors to more accurately measure the rotational angle (e.g., within 1 degree) of the magnet arrangement (and thus a rotatable shaft) over the prior magnet arrangements.

As indicated above, FIG. 5 is provided merely as an example. Other examples are possible and may differ from what was described with regard to FIG. 5.

Figure 6:
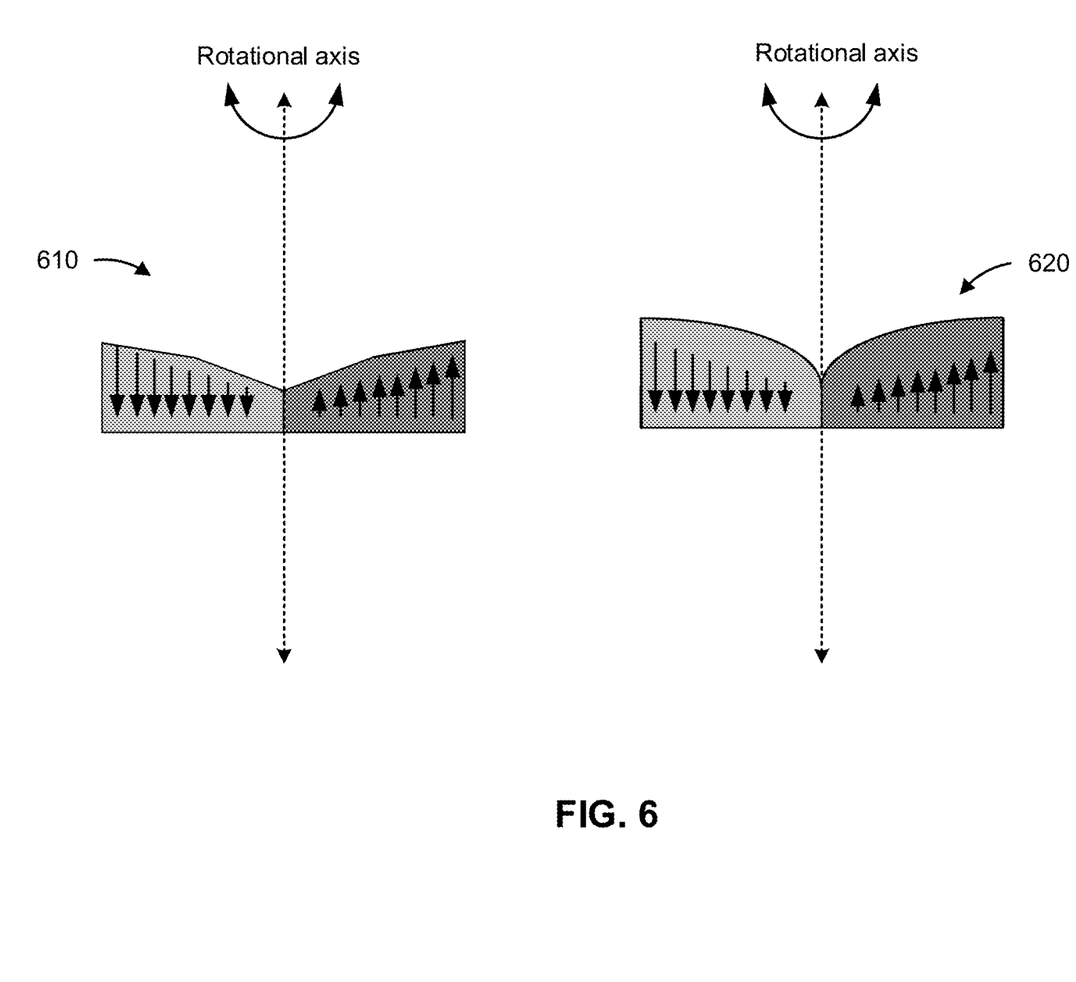

FIG. 6 are diagrams associated with example implementations of a magnet arrangement described herein. The example implementations of FIG. 6 include example implementations 610, 620 of shapes of wedges formed in a sensor facing end of the magnet arrangement. In some implementations, the shapes of the wedges may be milled into the magnet arrangement.

As shown in FIG. 6, a first wedge surface of a first ring portion and a second wedge surface of the second ring portion may be symmetrically shaped relative to the base of the wedge (and/or the rotational axis). As shown in FIG. 6, the first wedge surface and the second wedge surface of example implementation 610 are symmetrically comprised of a plurality of wedge partitions (shown as two partitions each) that have slopes relative to the rotational axis that increase as the wedge partitions extend from the sensor facing end of the magnet arrangement to the base of the wedge. For example, a first wedge partition that extends from the sensor facing end may have a slope of ¼ while a second wedge partition that extends from the first wedge partition to the base of the wedge may have a slope of ½.

As further shown in FIG. 6, the first wedge surface of the first ring portion and the second wedge surface of the second ring portion of example implementation 620 are symmetrically curved surfaces having slopes relative to the rotational axis that gradually increase as the wedge partitions extend from the sensor facing end of the magnet arrangement to the base of the wedge.

As indicated above, FIG. 6 is provided merely as an example. Other examples are possible and may differ from what was described with regard to FIG. 6.

Figure 7:
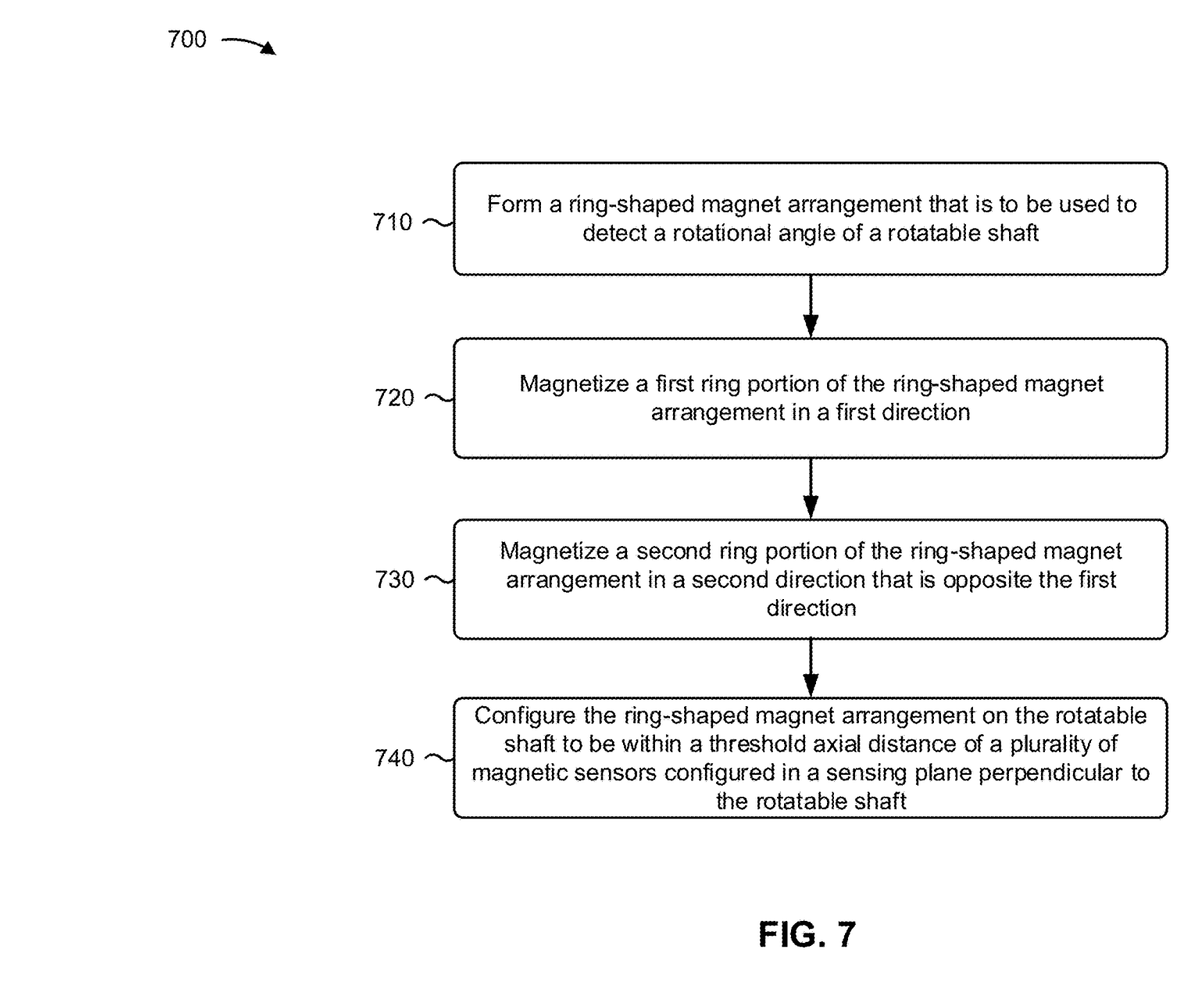
FIG. 7 is a flow chart associated with configuring a magnet arrangement described herein.

FIG. 7 is a flow chart of an example process 700 associated with configuring a magnet arrangement described herein. In some implementations, one or more process blocks of FIG. 7 may be performed to assemble a magnet arrangement described herein. In some implementations, one or more process blocks of FIG. 7 may be performed by devices (e.g., assembly or manufacturing devices or machines) associated with providing or assembling object 205, magnet arrangement 215, and/or magnetic sensors 220. Such devices or machines may perform one or more manufacturing processes (e.g., etching, molding, fastening, arranging, aligning, fitting, welding, magnetically energizing, and/or the like) to perform process 700 of FIG. 7.

As shown in FIG. 7, process 700 may include forming a ring-shaped magnet arrangement that is to be used to detect a rotational angle of a rotatable shaft (block 710). For example, the ring-shaped magnet arrangement may be magnet arrangement 215 and the rotatable shaft may be object 205. In some implementations, the ring-shaped magnet arrangement may be formed to include a wedge in a sensor facing end of the ring-shaped magnet arrangement. For example, the wedge may be formed from a first wedge surface on a first ring portion of the ring-shaped magnet arrangement and a second wedge surface on a second ring portion of the ring-shaped magnet arrangement. In some implementations, a base of the wedge may be formed to be a threshold axial distance from a radial surface, of the ring-shaped magnet arrangement, that is opposite the sensor facing end to form an intersecting thickness between the first ring portion and the second ring portion. In some implementations, the base of the wedge may be formed to be perpendicular to the rotational axis of the rotatable shaft.

In some implementations, the ring-shaped magnet arrangement may be formed to include radial end surfaces of the sensor facing end, such that a first end surface and second end surface are within a same end plane of the sensor facing end and parallel to the radial surface. In some implementations, the ring-shaped magnet arrangement may be formed to include a circular cylindrical inner circumferential surface that is connected to or formed as a part of the rotatable shaft and an elliptic cylindrical outer circumferential surface. For example, the elliptic cylindrical outer circumferential surface may be formed such that a minor axis of the elliptic cylindrical outer circumferential surface is aligned with the base of the wedge, and a major axis of the elliptic cylindrical outer circumferential surface is perpendicular to the base of the wedge.

In this way, a ring-shaped magnet arrangement may be formed to be used to detect a rotational angle of a rotatable shaft.

As further shown in FIG. 7, process 700 may include magnetizing a first ring portion of the ring-shaped magnet arrangement in a first direction (block 720). For example, the first ring portion may be magnetized in a first direction that is parallel to the rotatable shaft or at a threshold angle (e.g., within 10 degrees) of the rotatable shaft. The first ring portion may be magnetized using any suitable technique to transfer magnetic particles to the first ring portion (e.g., touch magnetization, residual magnetization, continuous magnetization, and/or the like).

In this way, a first ring portion of a ring-shaped magnet arrangement can be magnetized.

As further shown in FIG. 7, process 700 may include magnetizing a second ring portion of the ring-shaped magnet arrangement in a second direction that is opposite the first direction (block 730). For example, the second ring portion of the ring-shaped magnet may be magnetized using any suitable technique. In some implementations, the second direction may be opposite the first direction in that the first direction and second direction are at a 180 degree directional angle from one another relative to a particular axis (e.g., a rotational axis of the rotatable shaft). In some implementations, the second ring portion may be magnetized in a second direction that is parallel to the rotatable shaft or at a threshold angle (e.g., within 10 degrees) of the rotatable shaft. The first ring portion and the second ring portion may be magnetized simultaneously or one after the other.

In this way, a second ring portion of a ring-shaped magnet arrangement can be magnetized.

As further shown in FIG. 7, process 700 may include configuring the ring-shaped magnet arrangement on the rotatable shaft to be within a threshold axial distance of a plurality of magnetic sensors configured in a sensing plane perpendicular to the rotatable shaft (block 740). For example, the ring-shaped magnet arrangement may be configured on the rotatable shaft via a manufacturing process, such as a fitting process, an adhesion process, an over-mold process, and/or the like.

In this way, the ring-shaped magnet arrangement may be configured to be connected to or formed as a part of the rotatable shaft.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Some implementations are described herein to include a parallel relationship or a perpendicular relationship. As used herein, parallel is meant to cover substantially parallel and perpendicular is meant to cover substantially perpendicular. Further, as used herein, substantially refers to a described measurement, element, or relationship being within a tolerance (e.g., a design tolerance, a manufacturing tolerance, an industry standard tolerance, and/or the like).

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A ring-shaped magnet arrangement for use in determining a rotational angle of a rotatable shaft, the ring-shaped magnet arrangement configured to be connected to or formed as part of the rotatable shaft for co-rotation with the rotatable shaft around a rotational axis, the ring-shaped magnet arrangement comprising:
   a first ring portion comprising:
      a first wedge surface,
         wherein the first ring portion is magnetized in a first direction; and
   a second ring portion, that is diametrically opposite the first ring portion, the second ring portion comprising:
      a second wedge surface,
         wherein the first wedge surface and the second wedge surface form a wedge in a sensor facing end of the ring-shaped magnet arrangement, and
         wherein the second ring portion is magnetized in a second direction that is within a threshold angle of the first direction and different from the first direction, wherein the sensor facing end is axially opposite a radial end of the ring-shaped magnet arrangement, and wherein the ring-shaped magnet arrangement comprises a single piece of material with an intersecting thickness corresponding to an axial distance between the radial end of the ring-shaped magnet arrangement and a base of the wedge, wherein the base of the wedge extends from an outer circumferential surface of the ring-shaped magnet arrangement to an inner circumferential surface of the ring-shaped magnet arrangement.

2. The ring-shaped magnet arrangement of claim 1, wherein the radial end comprises a radial surface, of the ring-shaped magnet arrangement, that is perpendicular to the rotational axis.

3. The ring-shaped magnet arrangement of claim 1, wherein the sensor facing end comprises a first end surface and a second end surface, wherein the first end surface meets the first wedge surface and the second end surface meets the second wedge surface.

4. The ring-shaped magnet arrangement of claim 3, wherein the first end surface and the second end surface are parallel to the radial end.

5. The ring-shaped magnet arrangement of claim 1, wherein the threshold angle comprises an angle between 120 degrees and 180 degrees.

6. The ring-shaped magnet arrangement of claim 1, wherein the intersecting thickness is a threshold percentage of an axial distance between the sensor facing end and the radial end.

7. The ring-shaped magnet arrangement of claim 1, wherein:

the inner circumferential surface comprises a cylindrical inner circumferential surface that is connected to or formed as a part of the rotatable shaft; and the outer circumferential surface comprises an elliptic cylindrical outer circumferential surface.

8. The ring-shaped magnet arrangement of claim 7, wherein a minor axis of the elliptic cylindrical outer circumferential surface is aligned with the base of the wedge, and a major axis of the elliptic cylindrical outer circumferential surface is perpendicular to the base of the wedge.

9. A rotational angle detection system comprising:

a ring-shaped magnet arrangement for use in determining a rotational angle of a rotatable shaft, the ring-shaped magnet arrangement configured to be mounted on or formed as part of the rotatable shaft for co-rotation with the rotatable shaft around a rotational axis, wherein the ring-shaped magnet arrangement is configured to include:

a first ring portion magnetized in a first direction, and a second ring portion magnetized in a second direction that is between 120 degrees and 180 degrees from the first direction, wherein a first wedge surface of the first ring portion and a second wedge surface of the second ring portion form a wedge in a sensor facing end of the ring-shaped magnet arrangement, and the ring-shaped magnet arrangement includes an intersecting thickness corresponding to an axial distance between a base of the wedge and a radial end, of the ring-shaped magnet arrangement, that is axially opposite the sensor facing end, wherein the base of the wedge extends from an outer circumferential surface of the ring-shaped magnet arrangement to an inner circumferential surface of the ring-shaped magnet arrangement; and a magnetic sensor to measure the rotational angle of the rotatable shaft based on a sensed magnetic field formed from the wedge in the sensor facing end of the ring-shaped magnet arrangement.

10. The rotational angle detection system of claim 9, wherein the magnetic sensor is configured to be positioned within a threshold radial distance from the rotational axis, such that the sensor facing end of the ring-shaped magnet arrangement is between the magnetic sensor and the radial end of the ring-shaped magnet arrangement.

11. The rotational angle detection system of claim 10, wherein the magnetic sensor is one of a plurality of magnetic sensors, wherein the plurality of magnetic sensors are positioned in a same sensing plane that is perpendicular to the rotational axis.

12. The rotational angle detection system of claim 9, wherein the first wedge surface and the second wedge surface are symmetrically shaped relative to the base of the wedge.

13. The rotational angle detection system of claim 9, wherein the first wedge surface and the second wedge surface are symmetrically curved surfaces having slopes relative to the rotational axis that gradually increase as the curved surfaces extend from the sensor facing end of the ring-shaped magnet arrangement to the base of the wedge.

14. The rotational angle detection system of claim 9, wherein the first wedge surface and the second wedge surface are symmetrically comprised of a plurality of wedge partitions having slopes relative to the rotational axis that increase as the wedge partitions extend from the sensor facing end of the ring-shaped magnet arrangement to the base of the wedge.

15. A magnet arrangement for use in determining a rotational angle of a rotatable shaft, the magnet arrangement comprising:

a magnet formed of a single piece of material and configured to be connected to or formed as part of the rotatable shaft for co-rotation with the rotatable shaft around a rotational axis, the magnet including:

a first magnet portion comprising:

a first surface, wherein the first magnet portion is magnetized in a first direction;

and a second magnet portion, that is diametrically opposite the first magnet portion, the second magnet portion comprising:

a second surface, wherein the first surface and the second surface form a wedge in a sensor facing surface of the magnet arrangement, wherein the second magnet portion is magnetized in a second direction that is opposite the first direction, wherein a sensor facing end of the magnet arrangement is axially opposite a radial end of the magnet arrangement, and wherein the magnet arrangement comprises an intersecting thickness corresponding to an axial distance between the radial end of the magnet arrangement and a base of the wedge,
wherein the base of the wedge is perpendicular to the rotational axis and extends from an outer circumferential surface of the magnet arrangement to an inner circumferential surface of the magnet arrangement.

16. The magnet arrangement of claim 15, wherein the magnet arrangement produces a magnetic field that is to produce measurements in a sine wave used to determine the rotational angle of the rotatable shaft.

17. The magnet arrangement of claim 15, wherein the first direction and the second direction are parallel to the rotational axis of the rotatable shaft.

18. The magnet arrangement of claim 15, the first direction and the second direction are within a threshold angle of the rotational axis.

19. The magnet arrangement of claim 15, wherein the sensor facing end includes a first end surface and a second end surface,
the first end surface and second end surface being within a same end plane of the sensor facing end and being parallel to the radial end.

20. The magnet arrangement of claim 15, wherein
the inner circumferential surface comprises a cylindrical inner circumferential surface that is connected to or formed as a part of the rotatable shaft; and
the outer circumferential surface comprises an elliptic cylindrical outer circumferential surface,
wherein a minor axis of the elliptic cylindrical outer circumferential surface is aligned with the base of the wedge, and
wherein a major axis of the elliptic cylindrical outer circumferential surface is perpendicular to the base of the wedge.

* * * * *